US010455527B2

(12) United States Patent
Yang et al.

(10) Patent No.: US 10,455,527 B2
(45) Date of Patent: Oct. 22, 2019

(54) METHOD AND APPARATUS FOR TRANSMITTING AND RECEIVING WIRELESS SIGNAL IN WIRELESS COMMUNICATION SYSTEM

(71) Applicant: LG ELECTRONICS INC., Seoul (KR)

(72) Inventors: Suckchel Yang, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/502,778

(22) PCT Filed: Aug. 7, 2015

(86) PCT No.: PCT/KR2015/008311
§ 371 (c)(1),
(2) Date: Feb. 8, 2017

(87) PCT Pub. No.: WO2016/021992
PCT Pub. Date: Feb. 11, 2016

(65) Prior Publication Data
US 2017/0238268 A1    Aug. 17, 2017

Related U.S. Application Data

(60) Provisional application No. 62/034,799, filed on Aug. 8, 2014.

(51) Int. Cl.
*H04W 52/14* (2009.01)
*H04W 52/32* (2009.01)
(Continued)

(52) U.S. Cl.
CPC ............ *H04W 52/367* (2013.01); *H04L 5/00* (2013.01); *H04L 5/0048* (2013.01);
(Continued)

(58) Field of Classification Search
None
See application file for complete search history.

(56) References Cited

U.S. PATENT DOCUMENTS

| 8,811,249 B2 * | 8/2014 | Seo | H04W 52/146 370/311 |
| 8,818,442 B2 * | 8/2014 | Seo | H04W 52/146 455/522 |

(Continued)

FOREIGN PATENT DOCUMENTS

| KR | 1020140047495 | 4/2014 |
| KR | 1020140091733 | 7/2014 |

(Continued)

OTHER PUBLICATIONS

PCT International Application No. PCT/KR2015/008311, Written Opinion of the International Searching Authority dated Nov. 27, 2015, 17 pages.

(Continued)

*Primary Examiner* — Gregory B Sefcheck
(74) *Attorney, Agent, or Firm* — Lee Hong Degerman Kang Waimey

(57) ABSTRACT

The present invention relates to a wireless communication system and, particularly, to a method and an apparatus for the same, the method comprising: mapping, in an SF, a first set of physical channels over all symbols; mapping, in the SF, a second set of physical channels over all remaining symbols, excluding the last symbol; reducing transmission power of the first set of physical channels such that the sum of transmission powers of the first and second sets of physical channels does not exceed a maximum power value; dropping, in the SF, an SRS transmission when the sum of the reduced transmission power of the first physical channel and SRS transmission power exceeds the maximum power value; and performing, in the SF, an SRS transmission when (Continued)

the sum of the reduced transmission power of the first physical channel and SRS transmission power does not exceed the maximum power value.

8 Claims, 10 Drawing Sheets

(51) Int. Cl.
  *H04W 72/04* (2009.01)
  *H04W 52/36* (2009.01)
  *H04L 5/00* (2006.01)
  *H04W 52/34* (2009.01)
(52) U.S. Cl.
  CPC ......... *H04W 52/34* (2013.01); *H04W 52/346* (2013.01); *H04W 72/0413* (2013.01); *H04W 72/0446* (2013.01); *H04W 52/146* (2013.01); *H04W 52/325* (2013.01)

(56) References Cited

U.S. PATENT DOCUMENTS

| | | | | |
|---|---|---|---|---|
| 8,948,119 B2* | 2/2015 | Ahn | ............ | H04W 52/146 370/329 |
| 8,958,342 B2* | 2/2015 | Dinan | ............ | H04W 52/18 370/254 |
| 8,964,593 B2* | 2/2015 | Dinan | ............ | H04W 52/34 370/252 |
| 8,964,683 B2* | 2/2015 | Dinan | ............ | H04W 52/146 370/329 |
| 8,989,128 B2* | 3/2015 | Dinan | ............ | H04W 56/0005 370/329 |
| 9,001,780 B2* | 4/2015 | Chen | ............ | H04W 72/0413 370/330 |
| 9,179,425 B2* | 11/2015 | Dinan | ............ | H04W 52/386 |
| 9,379,874 B2* | 6/2016 | Noh | ............ | H04W 52/04 |
| 9,461,793 B2* | 10/2016 | Kim | ............ | H04L 5/0048 |
| 9,661,588 B2* | 5/2017 | Takaoka | ............ | H04W 52/367 |
| 9,706,533 B2* | 7/2017 | Pajukoski | ............ | H04W 72/0413 |
| 2011/0280169 A1* | 11/2011 | Seo | ............ | H04W 52/146 370/311 |
| 2011/0287804 A1* | 11/2011 | Seo | ............ | H04W 52/146 455/522 |
| 2013/0215811 A1* | 8/2013 | Takaoka | ............ | H04W 52/367 370/311 |
| 2015/0327244 A1* | 11/2015 | Pajukoski | ............ | H04L 5/0005 370/330 |

FOREIGN PATENT DOCUMENTS

| | | | | |
|---|---|---|---|---|
| WO | WO2011/155711 | * | 12/2011 | ............ H04W 52/36 |
| WO | 2013100541 | | 7/2013 | |
| WO | WO 2013/117231 | * | 8/2013 | ............ H04L 5/00 |
| WO | 2014109569 | | 7/2014 | |

OTHER PUBLICATIONS

Samsung, "SRS transmission for TDD-FDD CA", R1-142083, 3GPP TSG RAN WG1 Meeting #77, May 2014, 3 pages.

* cited by examiner

METHOD AND APPARATUS FOR TRANSMITTING AND RECEIVING WIRELESS SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2015/008311, filed on Aug. 7, 2105, which claims the benefit of U.S. Provisional Application No. 62/034,799, filed on Aug. 8, 2014, the contents of which are all hereby incorporated by reference herein in their entirety.

TECHNICAL FIELD

The present invention relates to a wireless communication system, and more particularly, to a method and apparatus for transmitting/receiving a wireless signal. The wireless communication system includes a CA-based (Carrier Aggregation-based) wireless communication system.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as code division multiple access (CDMA), frequency division multiple access (FDMA), time division multiple access (TDMA), orthogonal frequency division multiple access (OFDMA), or single carrier frequency division multiple access (SC-FDMA).

DISCLOSURE OF THE INVENTION

Technical Task

An object of the present invention is to provide a method of efficiently performing a process of transmitting and receiving a radio signal and an apparatus therefor. Another object of the present invention is to provide a method of efficiently controlling signal/channel transmission when transmission of a plurality of signals/channels is required at the same time and an apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of controlling SRS transmission, which is controlled by a user equipment in a subframe (SF) configured to transmit an SRS (sounding reference signal) in a wireless communication system, includes the steps of mapping a first set of physical channels over all SC-FDMA (single carrier frequency division multiple access) symbols in the SF, mapping a second set of physical channels over all of the remaining SC-FDMA symbols except the last SC-FDMA symbol in the SF, reducing transmit power of the first set of physical channels to make the sum of transmit power of the physical channels of the first set and the second set not exceed maximum transmit power, if the sum of the reduced transmit power of the physical channels of the first set and transmit power of the SRS exceed the maximum transmit power, dropping the SRS transmission in the SF, and if the sum of the reduced transmit power of the physical channels of the first set and the transmit power of the SRS does not exceed the maximum transmit power, performing the SRS transmission in the SF.

To further achieve these and other advantages and in accordance with the purpose of the present invention, according to a different embodiment, a user equipment configured to control SRS transmission in a subframe (SF) configured to transmit an SRS (sounding reference signal) in a wireless communication system includes an RF (radio frequency) module and a processor, the processor configured to map a first set of physical channels over all SC-FDMA (single carrier frequency division multiple access) symbols in the SF, the processor configured to map a second set of physical channels over all of the remaining SC-FDMA symbols except the last SC-FDMA symbol in the SF, the processor configured to reduce transmit power of the first set of physical channels to make the sum of transmit power of the physical channels of the first set and the second set not exceed maximum transmit power, the processor, if the sum of the reduced transmit power of the physical channels of the first set and transmit power of the SRS exceed the maximum transmit power, configured to drop the SRS transmission in the SF, the processor, if the sum of the reduced transmit power of the physical channels of the first set and the transmit power of the SRS does not exceed the maximum transmit power, configured to perform the SRS transmission in the SF.

Preferably, the sum of the reduced transmit power of the physical channels of the first set and the transmit power of the SRS may corresponds to the sum of transmit power at the last SC-FDMA symbol in the SF.

Preferably, first TA (timing advance) value can be applied to the first set of the physical channels and second TA value different from the first TA value can be applied to the second set of the physical channels and the SRS.

Preferably, dropping the SRS transmission in the SF may correspond to reducing of the transmit power of the SRS to 0.

Preferably, the physical channels of the first set and the physical channels of the second set can include at least one of PUCCH (physical uplink control channel) and PUSCH (physical uplink shared channel), respectively.

Advantageous Effects

According to the present invention, it is able to efficiently transmit and receive a radio signal in a wireless communication system. And, it is able to efficiently control signal/channel transmission when transmission of a plurality of signals/channels is required at the same time.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

Figure 1:
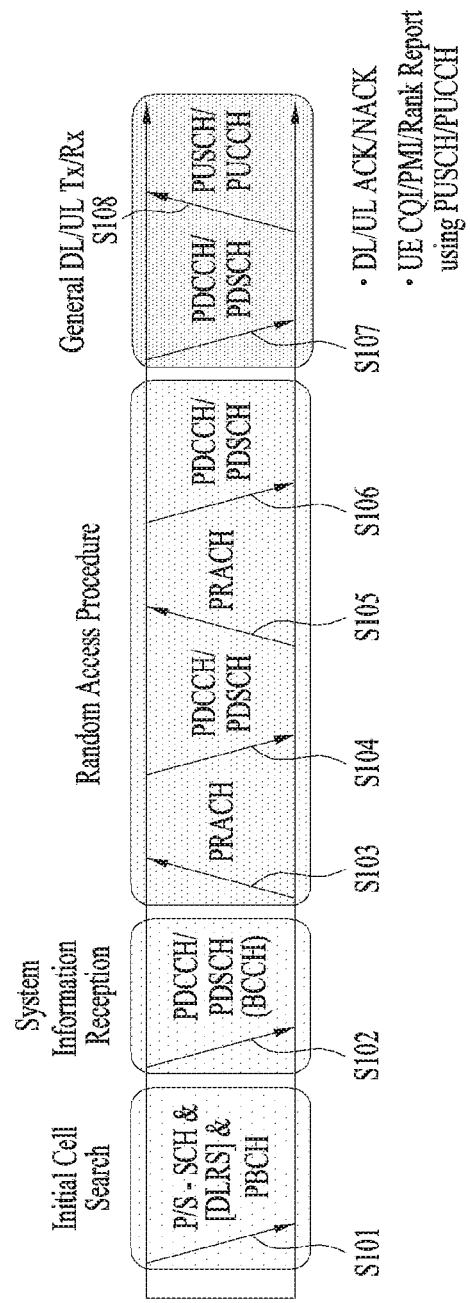
FIG. 1 illustrates physical channels and a general signal transmission method using the physical channels in a 3GPP LTE-(A) system corresponding to an example of wireless communication systems.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
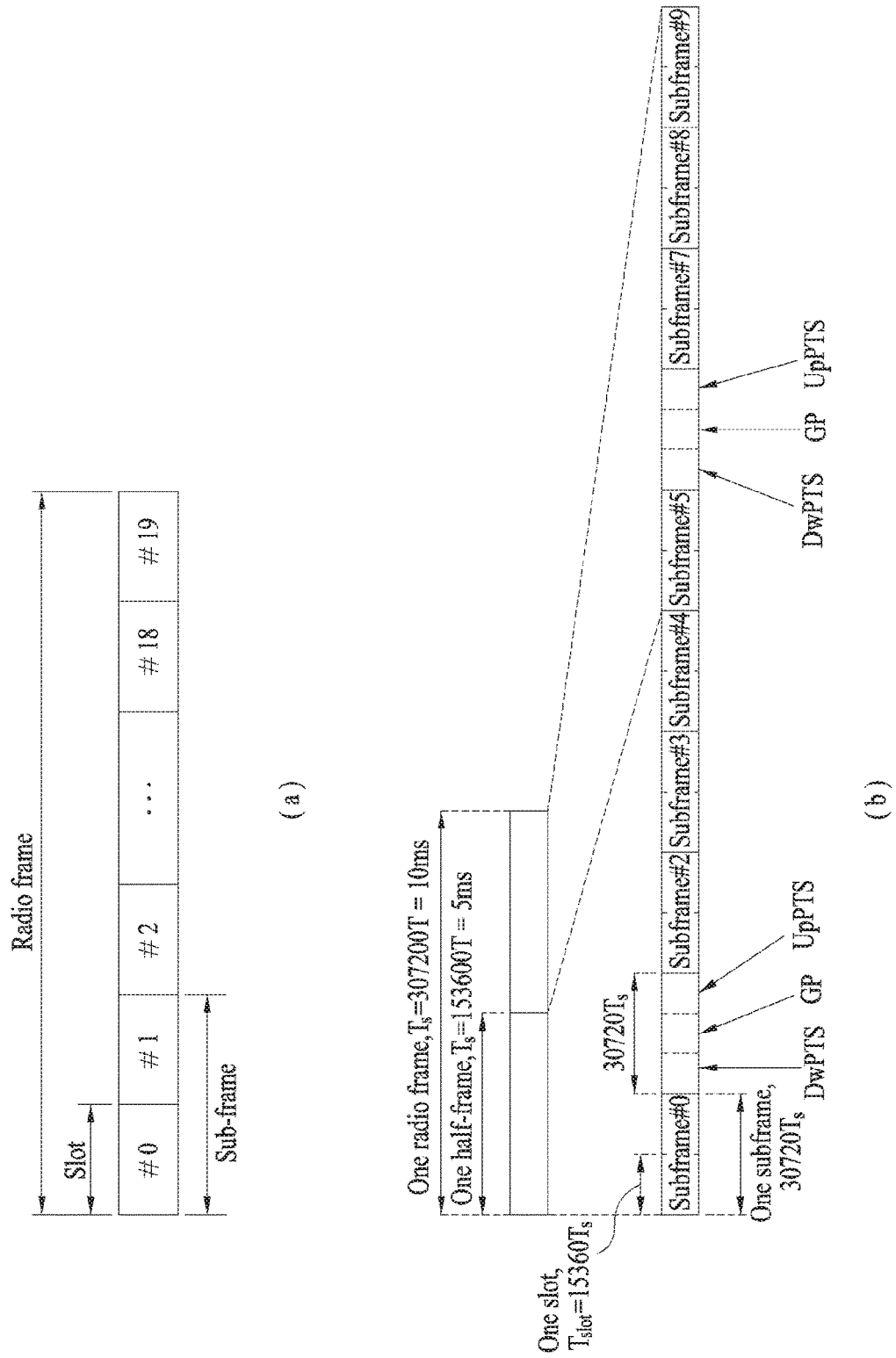
FIG. 2 illustrates a radio frame structure.

FIG. 2 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(a) illustrates a type-1 radio frame structure. A downlink subframe includes 10 subframes each of which includes 2 slots in the time domain. A time for transmitting a subframe is defined as a transmission time interval (TTI). For example, each subframe has a duration of 1ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Table 1 shows subframe configurations in a radio frame according to UL-DL configurations.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
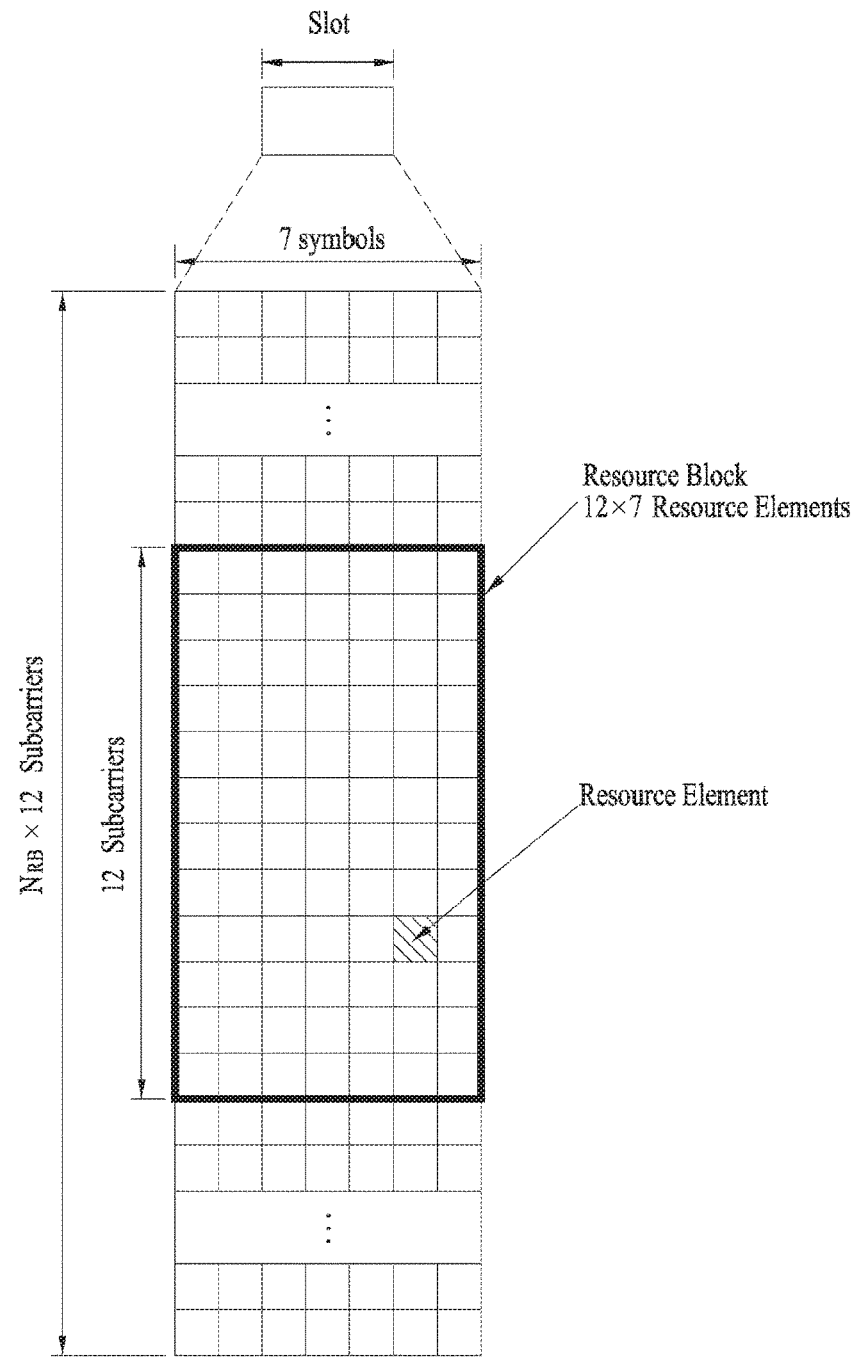
FIG. 3 illustrates a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present invention is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 4:
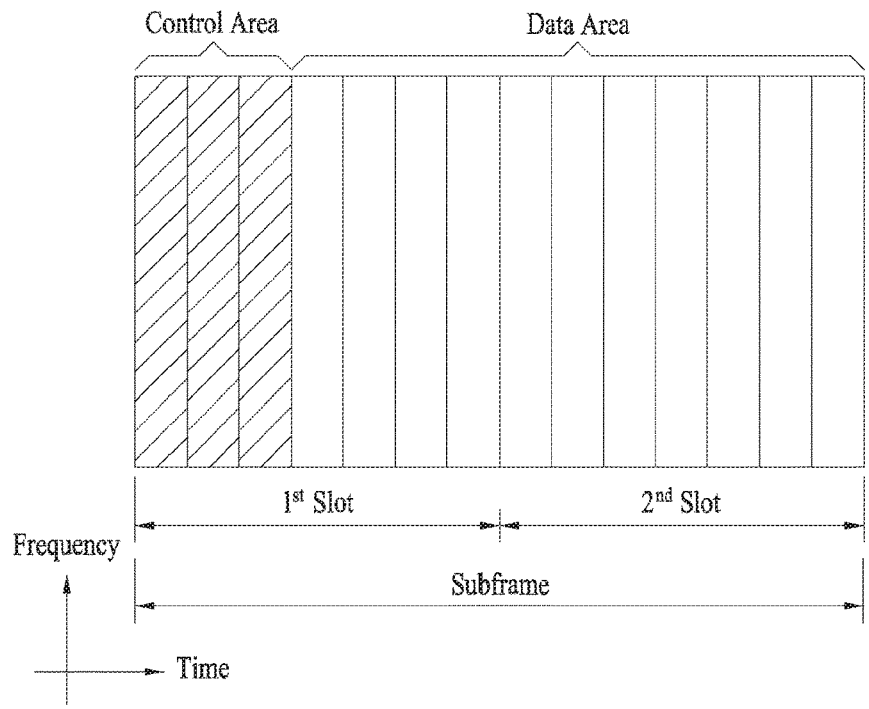
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. A arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 8 | 144 |
| 2 | 4 | 36 | 288 |
| 3 | 5 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Figure 5:
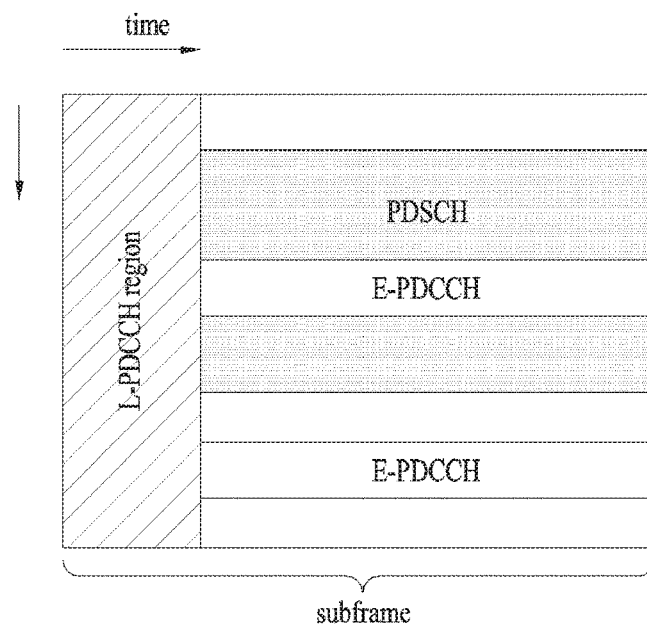
FIG. 5 illustrates an example of Enhanced Physical Downlink Control Channel (EPDCCH).

Transmission Mode (TM)
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO (Multiple Input Multiple Output)
Transmission mode 6: Closed-loop rank-1 precoding
Transmission mode 7: Single-antenna port (port5) transmission
Transmission mode 8: Double layer transmission (ports 7 and 8) or single-antenna port (port 7 or 8) transmission
Transmission mode 9: Transmission through up to 8 layers (ports 7 to 14) or single-antenna port (port 7 or 8) transmission DCI Format
Format 0: Resource grants for PUSCH transmission
Format 1: Resource assignments for single codeword PDSCH transmission (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments FIG. 5 illustrates an EPDCCH. The EPDCCH is a channel additionally introduced in LTE-A.

Referring to FIG. 5, a PDCCH (for convenience, legacy PDCCH or L-PDCCH) according to legacy LTE may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similarly to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type. In this specification, the PDCCH includes both L-PDCCH and EPDCCH unless otherwise noted.

Figure 6:
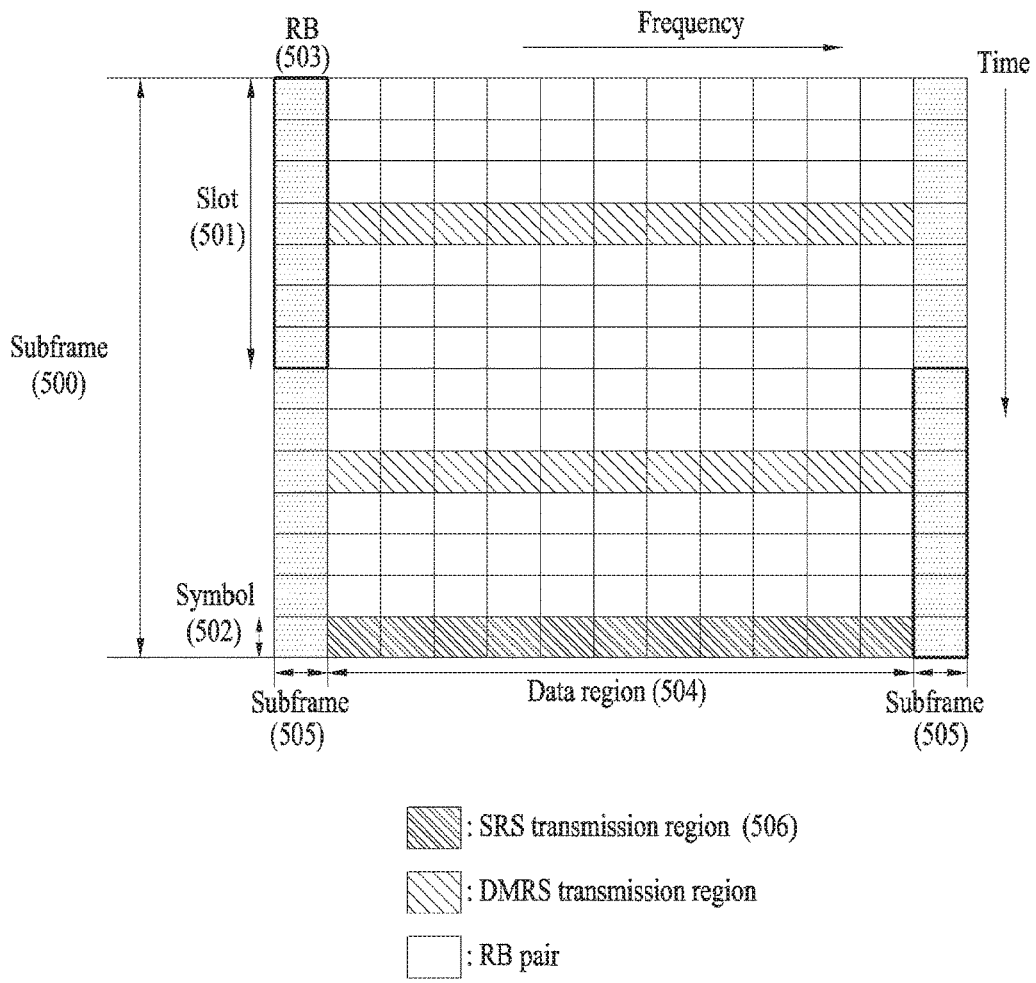
FIG. 6 illustrates the structure of an uplink subframe.

FIG. 6 illustrates a structure of an uplink subframe used in LTE(-A).

Referring to FIG. 6, a subframe 500 is composed of two 0.5 ms slots 501. Assuming a length of a normal cyclic prefix (CP), each slot is composed of 7 symbols 502 and one symbol corresponds to one SC-FDMA symbol. A resource block (RB) 503 is a resource allocation unit corresponding to 12 subcarriers in the frequency domain and one slot in the time domain. The structure of the uplink subframe of LTE(-A) is largely divided into a data region 504 and a control region 505. A data region refers to a communication resource used for transmission of data such as voice, a packet, etc. transmitted to each UE and includes a physical uplink shared channel (PUSCH). A control region refers to a communication resource for transmission of an uplink control signal, for example, downlink channel quality report from each UE, reception ACK/NACK for a downlink signal, uplink scheduling request, etc. and includes a physical uplink control channel (PUCCH). A sounding reference signal (SRS) is transmitted through an SC-FDMA symbol that is lastly positioned in the time axis in one subframe. SRSs of a plurality of UEs, which are transmitted to the last SC-FDMAs of the same subframe, can be differentiated according to frequency positions/sequences.

Figure 7:
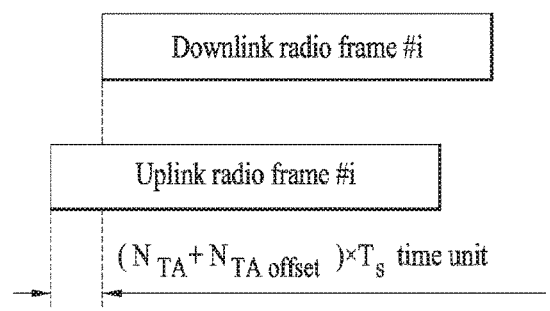
FIG. 7 illustrates uplink-downlink frame timing relation.

FIG. 7 illustrates uplink-downlink frame timing relation.

Referring to FIG. 7, transmission of the uplink radio frame number i starts prior to $(N_{TA}+N_{TAoffset})*T_s$ seconds from the start of the corresponding downlink radio frame. In case of the LTE system, $0 \leq N_{TA} \leq 20512$, $N_{TAoffset}=0$ in FDD, and $N_{TAoffset}=624$ in TDD. The value NTaoffset is a value in advance recognized by the BS and the UE. If NTA is indicated through a timing advance command during a random access procedure, the UE adjusts transmission timing of UL signal (e.g., PUCCH/PUSCH/SRS) through the above equation. UL transmission timing is set to multiples of $16T_s$. The timing advance command indicates the change of the UL timing based on the current UL timing. The timing advance command $T_A$ within the random access response is a 11-bit timing advance command, and indicates values of 0, 1, 2, . . . , 1282 and a timing adjustment value is given by $N_{TA}=T_A*16$. In other cases, the timing advance command $T_A$ is a 6-bit timing advance command, and indicates values of 0, 1, 2, . . . , 63 and a timing adjustment value is given by $N_{TA,new}=N_{TA,old}+(T_A-31)*16$. The timing advance command received at subframe n is applied from the beginning of subframe n+6. In case of FDD, as shown, transmitting timing of UL subframe n is advanced based on the start time of the DL subframe n. On the contrary, in case of TDD, transmitting timing of UL subframe n is advanced based on the end time of the DL subframe n+1 (not shown).

Figure 8:
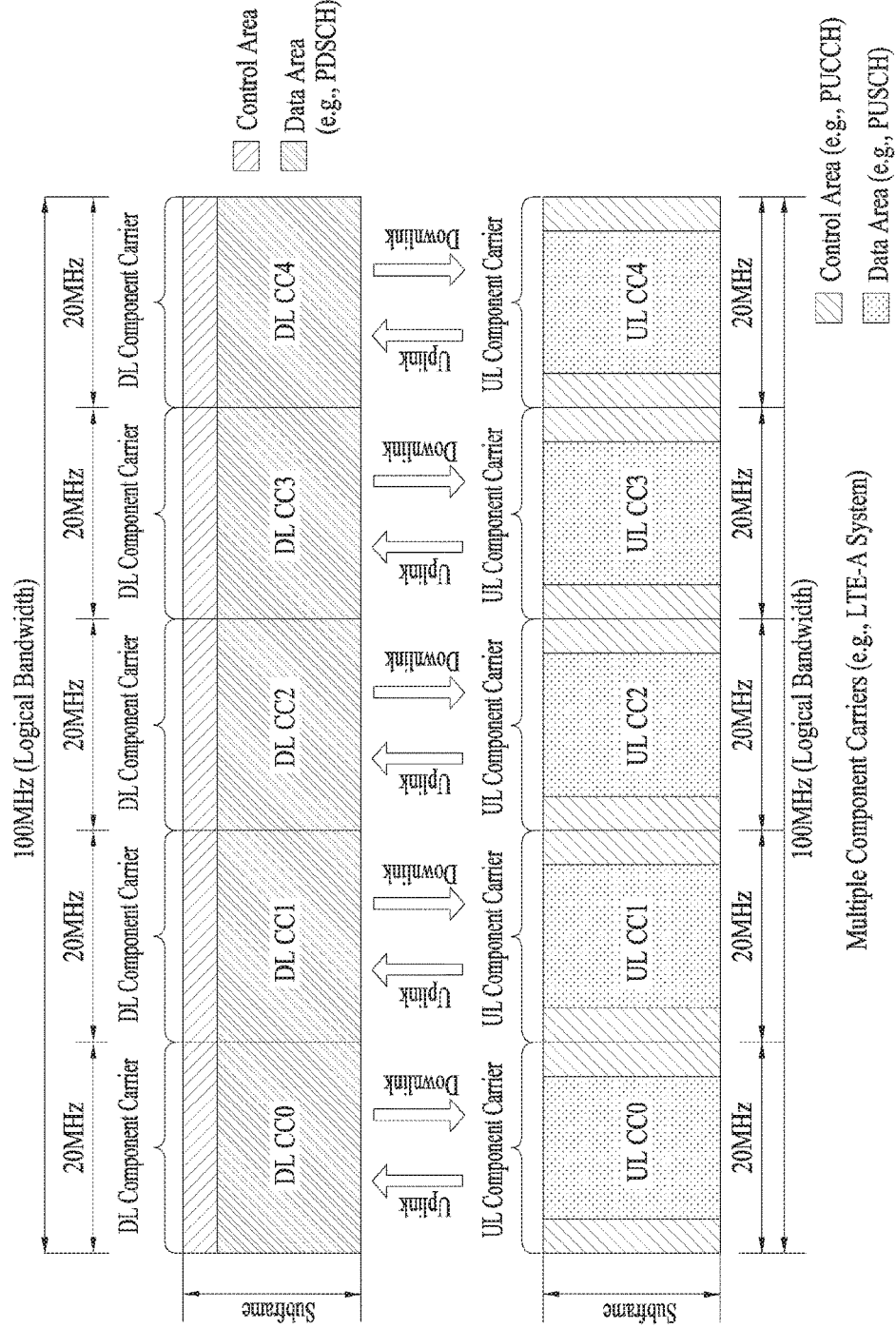
FIG. 8 illustrates a carrier aggregation (CA)-based wireless communication system.

FIG. 8 illustrates carrier aggregation (CA) communication system.

Referring to FIG. 8, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC may be referred to as a primary CC and other CCs may be referred to as secondary CCs. For example, when cross-carrier scheduling (or cross-CC scheduling) is applied, a PDCCH for downlink allocation can be transmitted on DL CC #0 and a PDSCH corresponding thereto can be transmitted on DL CC #2. The term "component carrier" may be replaced by other equivalent terms (e.g. "carrier", "cell", etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.

No CIF

CIF enabled: a PDCCH on a DL CC can be used to allocate a PDSCH or PUSCH resource on a specific DL/UL CC from among a plurality of aggregated DL/UL CCs using the CIF.

LTE DCI format extended to have CIF

CIF corresponds to a fixed x-bit field (e.g. x=3) (when CIF is set)

CIF position is fixed irrespective of DIC format size (when CIF is set)

When the CIF is present, the BS may allocate a monitoring DL CC (set) to reduce BD complexity of the UE. For PDSCH/PUSCH scheduling, the UE may detect/decode a PDCCH only on the corresponding DL CCs. The BS may transmit the PDCCH only through the monitoring DL CC (set). The monitoring DL CC set may be set UE-specifically, UE-group-specifically or cell-specifically.

Figure 9:
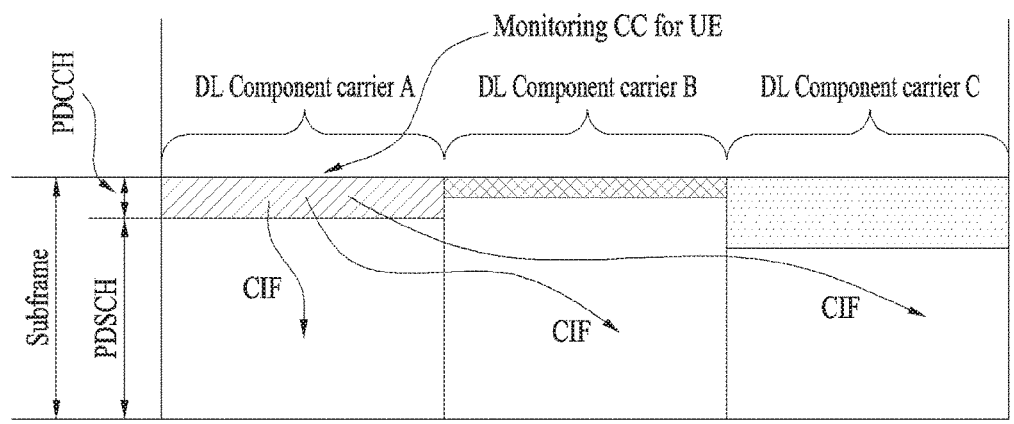
FIG. 9 illustrates a cross-carrier scheduling.

FIG. 9 illustrates scheduling when a plurality of carriers is aggregated. It is assumed that 3 DL CCs are aggregated and DL CC A is set to a PDCCH CC. DL CC A~C may be referred to as a serving CC, serving carrier, serving cell, etc. When the CIF is disabled, each DL CC can transmit only a PDCCH that schedules a PDSCH corresponding to the DL CC without a CIF according to LTE PDCCH rule (non-cross-CC scheduling). When the CIF is enabled through UE-specific (or UE-group-specific or cell-specific) higher layer signaling, a specific CC (e.g. DL CC A) can transmit not only the PDCCH that schedules the PDSCH of DL CC A but also PDCCHs that schedule PDSCHs of other DL CCs using the CIF (cross-scheduling). A PDCCH is not transmitted on DL CC B and DL CC C.

Figure 10:
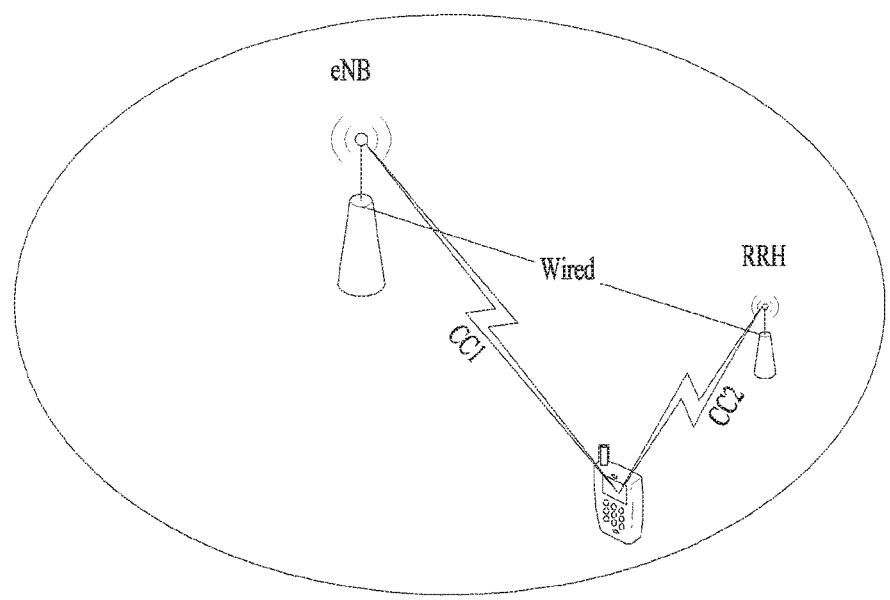
FIG. 10 illustrates aggregation of plural CCs having different UL synchronizations.

FIG. 10 illustrates a case in which plural CCs having different UL synchronizations are aggregated. In FIG. 10, a UE aggregates two CCs CC1 and CC2, CC1 performs transmission and reception using an RRH due to limited coverage and CC2 directly communicates with an eNB without RRH. In this case, propagation delay (or reception timing at the eNB) of a UL signal transmitted through CC1 from the UE and propagation delay (or reception timing at the eNB) of a UL signal transmitted through CC2 from the UE may differ from each other due to the position of the UE and frequency characteristics. When plural CCs have different propagation delay characteristics, it may be desirable to apply plural TA values for the CCs.

Figure 11:
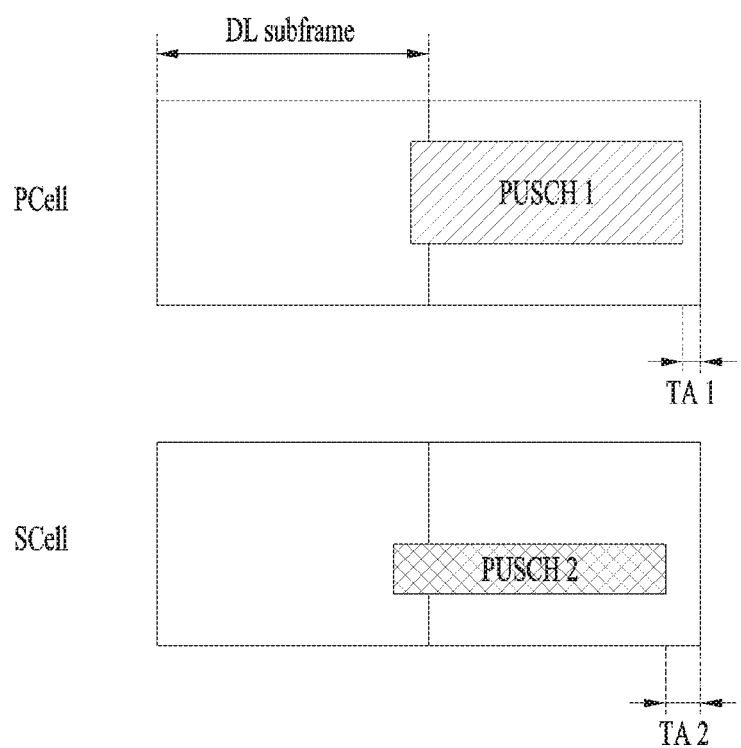
FIG. 11 illustrates transmission of a UL signal using a plurality of TAs.

FIG. 11 illustrates a case in which a UE aggregates two CCs (e.g. a PCell (PCC) and an SCell (SCC)) and different TA values are applied to the cells to transmit UL signals. As shown in FIG. 11, TA 1 can be applied to UL transmission of the PCell and TA 2 can be applied to UL transmission of the SCell. FIG. 11 shows a case in which transmission end timing of a UL subframe/signal (e.g. PUSCH, PUCCH, SRS, etc.) is advanced by TA from DL subframe reception end timing. Equivalently, transmission start timing of a UL subframe/signal (e.g. PUSCH, PUCCH, SRS, etc.) can be advanced by TA from DL subframe reception start timing.

Accordingly, independent allocation of TA per CC group (referred to as a TA group hereinafter) can be considered. Here, the TA group (TAG) may include one or more CCs. A single TA can be commonly applied to CCs in a TAG. In the case of a TAG (referred to as TAG_PCC hereinafter) to which a PCC (PCell) belongs, a TA determined based on the PCC or adjusted through a random access procedure with respect to the PCC can be applied to all CCs in TAG_PCC. In the case of a TAG (referred to as TAG_SCC) including SCCs (SCells) only, a TA determined based on a specific SCC in TAG_SCC may be applied to all CCs in TAG_SCC.

Embodiment: Method of Transmitting a Plurality of UL Channels/Signals

In LTE-A (e.g., Rel-10/11) system operating based on CA of a plurality of cells, transmission of a plurality of UL channels/signals transmitted through a plurality of the cells at the same timing (e.g., an identical subframe or an identical SC-FDMA symbol) can be requested (scheduled/configured) at the same time. In this case, if the sum of power of a plurality of UL transmissions exceeds a maximum transmit power (i.e., Pmax), it may be able to adjust/control transmit power of each UL channel/signal based on protection priority to make the sum of total UL transmit power to be equal to or less than the Pmax. For example, UL power control can be performed in a manner of preferentially reducing transmit power of a UL channel/signal of which the protection priority is low. The Pmax may correspond to maximum transmit power of a UE, maximum transmit power of a cell group, maximum transmit power of a cell, preferably, maximum transmit power of a UE. The protection priority can be configured in an order of PRACH>PUCCH>PUSCH with UCI>PUSCH without UCI according to the importance of a UL channel/signal.

It may be able to use various methods to reduce transmit power of a channel/signal of which the protection priority is lower. For example, assume that transmit power of a channel/signal of which the protection priority is higher corresponds to PA and transmit power of a channel/signal of which the protection priority is lower corresponds to $P_B$. In this case, if such a situation as '$P_A+P_B$>Pmax' occurs, a UE may reduce the $P_B$ to $P_B'$ or 0. The $P_B'$ may have a form such as $\alpha*P_B$, $P_B-\beta$, or $\alpha*P_B\pm\beta$. In this case, a unit of a power value may correspond to a linear-scale value or a log-scale value. In this case, a is equal to or greater than 0 and less than 1 and β is a positive real number. For example, it may be able to determine a value that satisfies $P_A+\alpha*P_B\leq Pmax$.

Meanwhile, transmission of an SRS of a specific cell and transmission of a UL channel/signal (e.g., PRACH/PUCCH/PUSCH) of a different cell can be simultaneously requested at the same timing (e.g., an identical subframe or an identical SC-FDMA symbol). In this case, if the sum of the total UL transmit power exceeds Pmax, (unlike collision between UL channels/signals), the SRS transmission is exceptionally omitted/abandoned (i.e., dropped). Since the SRS corresponds to a UL channel sounding signal, i.e., a UL signal which is transmitted for the purpose of measuring a UL channel in an eNB, it may be more stable to drop the transmission itself rather than degrade measurement accuracy in the eNB by randomly reducing predetermined transmit power (which is determined in advance for the aforementioned usage).

Figure 12:
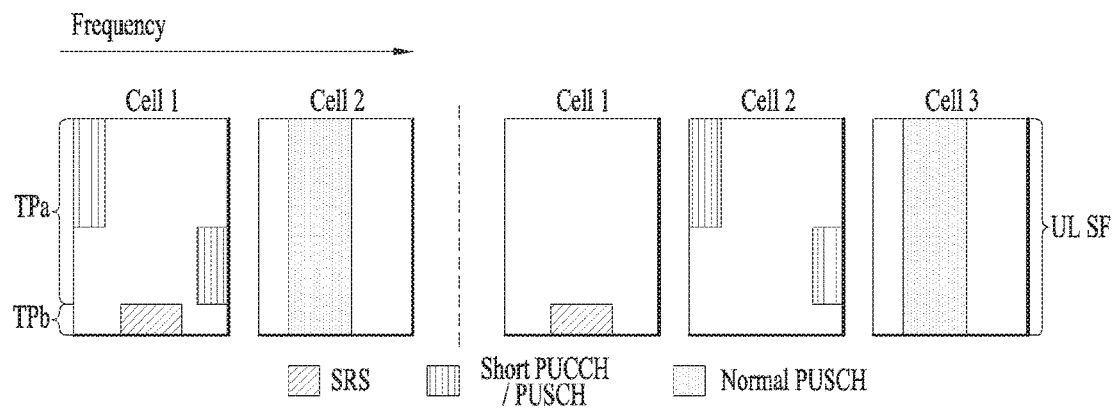
FIG. 12 illustrates a case that transmission of a plurality of UL channels/signals is required at the same time in the same subframe.

Meanwhile, when transmission of an SRS and transmission of two or more different UL channels/signals (e.g., PUCCH/PUSCH) are required in the same subframe at the same time via a plurality of cells, the sum of the total UL transmit power may exceed the Pmax. For example, as shown in FIG. 12, transmission of a plurality of UL channels/signals can be requested in the same subframe at the same time. Referring to FIG. 12, UL channel/signal transmission situations described in the following are feasible.

UL Channel/Signal Transmission Situation 1
  Cell 1: short PUCCH (or short PUSCH) transmission and SRS transmission are required.
  Cell 2: normal PUSCH transmission is required.
UL Channel/Signal Transmission Situation 2
  Cell 1: SRS transmission is required.
  Cell 2: short PUCCH or short PUSCH transmission (or normal PUCCH or normal PUSCH) transmission is required.
  Cell 3: normal PUSCH transmission is required.

*SRS/short PUCCH/PUSCH transmission cell belongs to the same TAG and normal PUCCH/PUSCH transmission cell may belong to a different TAG. For example, in the situation 1, the cell 1 and the cell 2 may belong to a different TAG. In the situation 2, the cells 1 and 2 may belong to the same TAG, the cell 3 may belong to a different TAG, the cells 2 and 3 may belong to the same TAG, and the cell 1 may belong to a different TAG.

*Short PUCCH may correspond to PUCCH configured not to use the last SC-FDMA symbol of a subframe for control information transmission to protect SRS transmission of a UE or a different UE. Short PUSCH may correspond to PUSCH configured not to use the last SC-FDMA symbol of a subframe for data (e.g., transport block) transmission to protect SRS transmission of a UE or a different UE. In particular, the short PUCCH/PUSCH is mapped/transmitted over all SC-FDMA symbols except an RS and the last SC-FDMA symbol in a subframe. An RS SC-FDMA symbol may correspond to an SC-FDMA symbol to which a DMRS for demodulating PUCCH/PUSCH is mapped/transmitted (refer to FIG. 6).

*Normal PUCCH correspond to PUCCH configured to use even the last SC-FDMA symbol of a subframe to transmit control information. Normal PUSCH correspond to PUSCH configured to use even the last SC-FDMA symbol of a subframe to transmit data. The normal PUCCH/PUSCH is mapped/transmitted over all SC-FDMA symbols except an RS SC-FDMA symbol in a subframe.

In FIG. 12, both (i) the sum of transmit power of UL channel/signal (e.g., PUCCH/PUSCH and PUSCH) except an SRS and (ii) the sum of transmit power of a UL channel/signal (e.g., normal PUSCH) and an SRS (in the last SC-FDMA symbol) may exceed the Pmax. (i) corresponds to the sum of transmit power of a TPa section and (ii) corresponds to the sum of transmit power of a TPb section. In this case, if a legacy UL power control scheme and an SRS signal processing scheme are independently applied, a UE may be able to perform operations described in the following.

Case 1) If collision occurs between PUCCH(s)/PUSCH(s) or collision occurs between PUSCH(s), power adjustment according to protection priority is performed on the PUCCH(s)/PUSCH(s).

Case 2) If collision occurs between SRS and PUCCH(s)/PUSCH(s), SRS transmission is dropped.

However, if the sum of the transmit power of PUCCH/PUSCH readjusted (i.e., reduced) in the Case 1 and transmit power of an SRS is equal to or less than the Pmax, dropping of the SRS transmission performed in the Case 2 not only becomes wasteful in terms of a UL transmission resource but also becomes inefficient in terms of UL channel estimation.

In order to solve the aforementioned problem, the present invention proposes to determine whether to drop the SRS transmission of the Case 2 according to whether or not the sum of the readjusted PUCCH/PUSCH transmit power and the transmit power of the SRS exceeds the Pmax in the situation shown in FIG. 12. Specifically, if the sum of the PUCCH/PUSCH transmit power readjusted via the Case 1 and the transmit power of the SRS exceeds the Pmax, a UE can drop the SRS transmission (while transmitting PUCCH/PUSCH only). If the sum is equal to or less than the Pmax, the UE can perform the SRS transmission (as well as PUCCH/PUSCH transmission). It may be able to restrict the proposed method to be applied only when a plurality of TAs are configured in UL CA situation.

Figure 13:
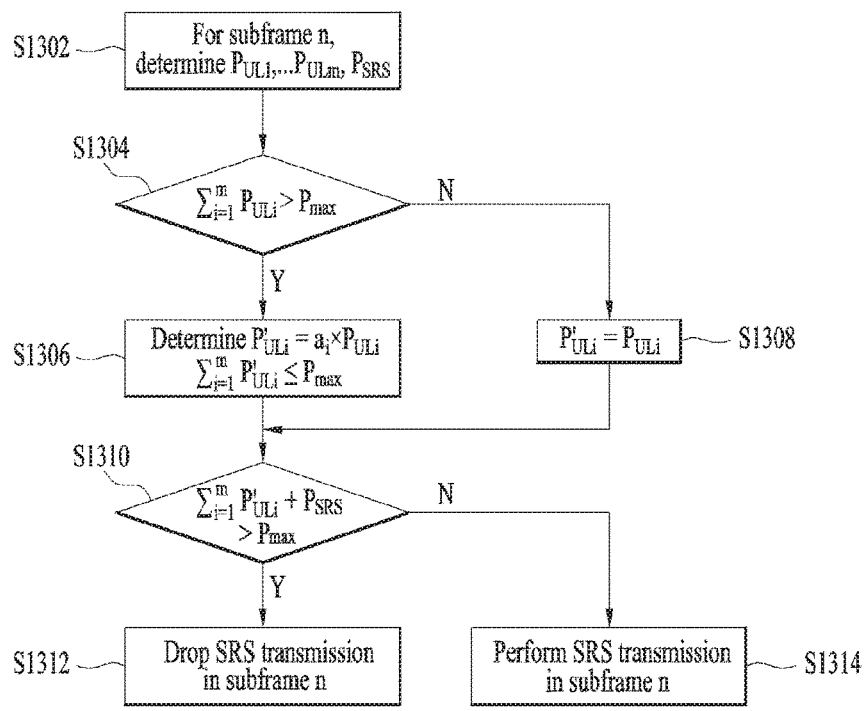
FIGS. 13 and 14 illustrate a method of transmitting a UL channel/signal according to embodiments of the present invention.

FIG. 13 illustrates a method of transmitting a UL channel/signal according to one embodiment of the present invention. FIG. 13 illustrates a case that one SRS is transmitted.

Referring to FIG. 13, a UE can determine transmit power of each channel/signal to transmit a UL channel/signal in a subframe n [S1302]: $P_{UL,1}, \ldots P_{UL,m}, P_{SRS}$. In this case, $P_{UL,i}$, (i=1~m) indicates transit power of a UL channel/signal except an SRS (hereinafter, non-SRS UL channel/signal) and $P_{SRS}$ indicates transmit power of an SRS. The non-SRS UL channel/signal includes PUCCH, PUSCH, PRACH, and the like. Subsequently, the UE checks whether or not the sum of transmit power of the non-SRS UL channel/signal (UL, i) exceeds maximum transmit power (Pmax) [S1304]. If the sum of transmit power of the non-SRS UL channel/signal (UL, i) does not exceed the Pmax [S1304, N], the UE may not adjust the transmit power of the non-SRS UL channel/signal [S1308]. On the contrary, if the sum of transmit power of the non-SRS UL channel/signal (UL, i) exceeds the Pmax [S1304, Y], the UE can reduce transmit power of each UL channel/signal according to protection priority to make the sum of transmit power of the non-SRS UL channel/signal not exceed the Pmax [S1306]. In this case, $0 \le \alpha_i < 1$ (or, $0 \le \alpha_i \le 1$) can be satisfied. Subsequently, the UE checks whether or not the sum of the reduced transmit power ($P'_{UL,i}$) of the non-SRS UL channel/signal and the transmit power of the SRS exceeds the Pmax [S1310]. It may be able to restrict the step S1310 to be performed on the basis of the last SC-FDMA symbol of a subframe. For example, referring to FIG. 12, it is able to determine whether or not the sum of the transmit power of UL channel/signal exceeds the Pmax on the basis of the sum of transmit power of normal PUCCH/PUSCH and transmit power of an SRS. In the step S1310, transmit power of short PUCCH/PUSCH can be excluded from the $P'_{UL,i}$. Or, the $P'_{UL,i}$ may correspond reduced transmit power of a TAG to which an SRS transmission cell belongs and a different TAG to which the non-SRS channel/signal belongs. If the sum of the reduced transmit power ($P'_{UL,i}$) of the non-SRS UL channel/signal and the transmit power of the SRS exceeds the Pmax [S1310, Y], the UE can drop (i.e., abandon) SRS transmission in the subframe n [S1310]. On the contrary, if the sum of the reduced transmit power ($P'_{UL,i}$) of the non-SRS UL channel/signal and the transmit power of the SRS does not exceed the Pmax [S1310, N], the UE can perform the SRS transmission in the subframe n [S1314]. The non-SRS UL channel/signal is normally transmitted in the subframe n irrespective of whether or not the SRS is transmitted.

Meanwhile, if transmission of two or more SRSs and transmission of a non-SRS UL channel/signal (e.g., normal PUCCH, normal PUSCH) are requested at the same time in an identical (last) SC-FDMA symbol through a plurality of cells, the sum of the total UL transmit power may exceed the Pmax. In this case, (i) SRS transmission is sequentially dropped according to protection priority or a random order and (ii) the remaining SRSs (not dropped) are transmitted when the sum of the remaining total UL transmit power from which the dropped SRS transmit power is subtracted is equal to or less than the Pmax. For example, the protection priority can be configured based on at least one selected from the group consisting of aperiodic SRS>periodic SRS, Pcell>Scell (in terms of a cell in which an SRS is transmitted), and low cell index>high cell index. And/or, the protection priority can be configured based on at least one selected from the group consisting of transmit power size (in terms of SRS transmission signal), transmission period, and transmission bandwidth size.

Figure 14:
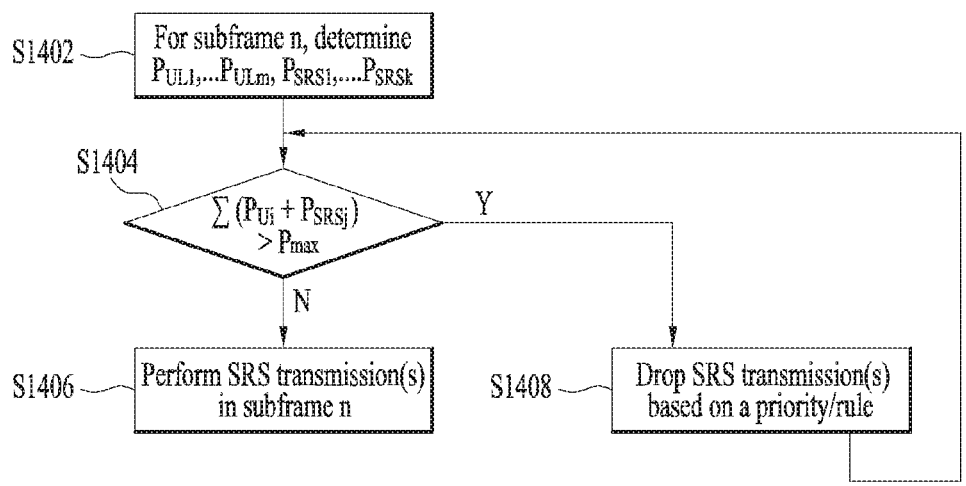

FIG. 14 illustrates a method of transmitting a UL channel/signal according to one embodiment of the present invention. FIG. 14 illustrates a case that transmission of a plurality of SRSs is required.

Referring to FIG. 14, a UE can determine transmit power of each channel/signal to transmit a UL channel/signal in a subframe n [S1402]: $P_{UL,1}, \ldots P_{UL,m}, P_{SRS,1}, \ldots P_{SRS,k}$. In this case, $P_{UL,i}$ (i=1~m) indicates transmit power of a UL channel/signal except an SRS (i.e., non-SRS UL channel/signal) and $P_{SRS,j}$ (j=1~k) indicates transmit power of SRS. Subsequently, the UE checks whether or not the sum of transmit power of the total UL channel/signal (i.e., non-SRS UL channel/signal+SRS) exceeds maximum transmit power (Pmax) [S1404]. If the sum of transmit power of the total UL channel/signal exceeds the Pmax [S1404, Y], the UE drops SRS transmission according to protection priority/rule [S1408] and checks again whether or not the sum of transmit power of the total UL channel/signal exceeds the Pmax [S1404]. After transmission of a partial SRS among the entire SRSs is sequentially dropped, if the sum of transmit power of the total UL channel/signal does not exceed the Pmax [S1404, N], the UE can transmit the remaining SRSs in the subframe n [S1406]. The transmit power ($P_{UL,i}$) of the non-SRS UL channel/signal described in the step S1404 may correspond to the transmit power ($P'_{UL,i}$) according to the steps S1304 to S1308 mentioned earlier in FIG. 13. The non-SRS UL channel/signal is normally transmitted in the subframe n irrespective of whether or not the SRS is transmitted.

Figure 15:
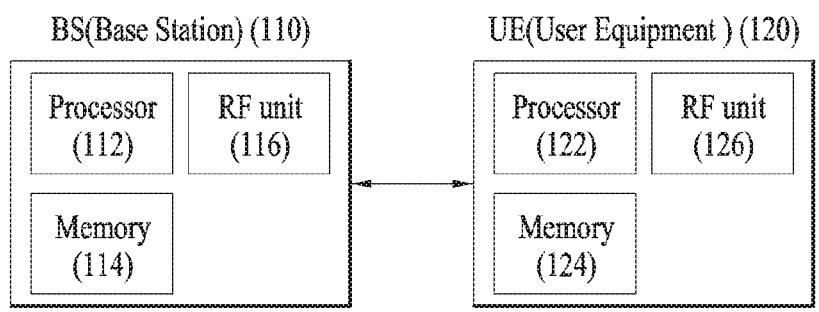
FIG. 15 illustrates a base station and a user equipment applicable to an embodiment of the present invention.

FIG. 15 illustrates a BS and a UE of a wireless communication system, which are applicable to embodiments of the present invention.

Referring to FIG. 15, the wireless communication system includes a BS 110 and a UE 120. When the wireless communication system includes a relay, the BS or UE can be replaced by the relay.

The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The embodiments of the present invention mentioned in the foregoing description may be applicable to various kinds of mobile communication systems.

What is claimed is:

1. A method for controlling SRS (sounding reference signal) transmission in a subframe (SF) in a wireless communication system, the method performed by a user equipment and comprising:
    mapping a first set of physical channels over all SC-FDMA (single carrier frequency division multiple access) symbols in the SF of a first cell;
    mapping a second set of physical channels over all remaining SC-FDMA symbols except a last SC-FDMA symbol in the SF of a second cell;
    reducing transmit power of the first set of physical channels such that a first sum of transmit power of the first and seconds sets of the physical channels does not exceed a maximum transmit power;
    dropping the SRS transmission in the SF of a cell other than the first cell when a second sum of the reduced transmit power of the first set of the physical channels and transmit power of the SRS exceeds the maximum transmit power; and
    performing the SRS transmission in the SF of the cell other than the first cell when the second sum does not exceed the maximum transmit power,
    wherein the first sum corresponds to a sum of transmit power at all of the SC-FDMA symbols except the last SC-FDMA symbol in the SF, and
    wherein the second sum corresponds to a sum of transmit power at the last SC-FDMA symbol in the SF.

2. The method of claim 1, further comprising:
    applying a first TA (timing advance) value to the first set of the physical channels; and
    applying a second TA value different from the first TA value to the second set of the physical channels and the SRS.

3. The method of claim 1, wherein dropping the SRS transmission in the SF includes reducing the transmit power of the SRS to 0.

4. The method of claim 1, wherein each of the first set of the physical channels and the second set of the physical channels comprise at least a PUCCH (physical uplink control channel) or a PUSCH (physical uplink shared channel).

5. A user equipment (UE) for controlling SRS (sounding reference signal) transmission in a subframe (SF) in a wireless communication system, the UE comprising:
    an RF (radio frequency) module configured to transmit and receive signals; and
    a processor configured to:
    map a first set of physical channels over all SC-FDMA (single carrier frequency division multiple access) symbols in the SF of a first cell;

map a second set of physical channels over all remaining SC-FDMA symbols except a last SC-FDMA symbol in the SF of a second cell;

reduce transmit power of the first set of physical channels such that a first sum of transmit power of the first and seconds sets of the physical channels does not exceed a maximum transmit power, drop the SRS transmission in in the SF of a cell other than the first cell when a second sum of the reduced transmit power of the first set of the physical channels and transmit power of the SRS exceeds the maximum transmit power; and perform the SRS transmission in the SF of the cell other than the first cell when the second sum does not exceed the maximum transmit power, wherein the first sum corresponds to a sum of transmit power at all of the SC-FDMA symbols except the last SC-FDMA symbol in the SF, and wherein the second sum corresponds to a sum of transmit power at the last SC-FDMA symbol in the SF.

6. The user equipment of claim 5, wherein the processor is further configured to:

apply a first TA (timing advance) value to the first set of the physical channels; and apply a second TA value different from the first TA value to the second set of the physical channels and the SRS.

7. The user equipment of claim 5, wherein dropping the SRS transmission in the SF includes reducing the transmit power of the SRS to 0.

8. The user equipment of claim 5, wherein each of the first set of the physical channels and the second set of the physical channels comprise at least a PUCCH (physical uplink control channel) or a PUSCH (physical uplink shared channel).

* * * * *